US011263677B2

United States Patent
Gutman et al.

(10) Patent No.: US 11,263,677 B2
(45) Date of Patent: Mar. 1, 2022

(54) SYSTEMS AND METHODS FOR A SOCIAL MEDIA PURCHASING TOOL

(71) Applicant: Bank of America Corporation, Charlotte, NC (US)

(72) Inventors: Sean Gutman, Lakewood, CO (US); Joseph Castinado, Northglenn, CO (US)

(73) Assignee: Bank of America Corporation, Charlotte, NC (US)

( * ) Notice: Subject to any disclaimer, the term of this patent is extended or adjusted under 35 U.S.C. 154(b) by 140 days.

(21) Appl. No.: 16/678,503

(22) Filed: Nov. 8, 2019

(65) Prior Publication Data

US 2021/0142381 A1 May 13, 2021

(51) Int. Cl.
*G06Q 30/00* (2012.01)
*G06Q 30/06* (2012.01)
*G06Q 30/02* (2012.01)
*G06Q 50/00* (2012.01)

(52) U.S. Cl.
CPC ..... *G06Q 30/0621* (2013.01); *G06Q 30/0255* (2013.01); *G06Q 30/06* (2013.01); *G06Q 30/0601* (2013.01); *G06Q 30/0633* (2013.01); *G06Q 30/0639* (2013.01); *G06Q 30/0641* (2013.01); *G06Q 50/01* (2013.01)

(58) Field of Classification Search
CPC .................. G06Q 30/0601–0645; G06Q 30/08
USPC ................................................ 705/26.1–27.2
See application file for complete search history.

(56) References Cited

U.S. PATENT DOCUMENTS

| | | |
|---|---|---|
| 8,340,796 B2 | 12/2012 | Stefik |
| 8,402,356 B2 | 3/2013 | Martinez et al. |
| 8,458,046 B2 | 6/2013 | Myslinski |
| 8,549,061 B2 | 10/2013 | Rao et al. |
| 8,620,828 B1 | 12/2013 | Harrison, Jr. |
| 8,626,579 B2 | 1/2014 | Fordyce, III et al. |
| 8,661,550 B2 | 2/2014 | Reddy et al. |

(Continued)

OTHER PUBLICATIONS

Fleming, Molly, Instagram launches shoppable posts as it looks to play a bigger role in ecommerce, MarkingWeek, accessed at [https://www.marketingweek.com/instagram-launches-shoppable-posts-looks-play-bigger-role-ecommerce/] (Year: 2018).*

(Continued)

*Primary Examiner* — Jeffrey A. Smith
*Assistant Examiner* — Lindsey B Smith

(57) ABSTRACT

A system includes a device, a database, and a processor. The device receives a social network post including text and an image depicting a customizable product. The database stores a purchase history of a user of the device. In response to determining that the device displayed the post, the processor determines, using a machine learning algorithm, that the image depicts the product and determines a set of retailers offering the product. The processor predicts, based in part on the purchase history, a customization for the customizable feature of the product that the user prefers and a retailer of the set of retailers offering the customized product. The processor then sends a recommendation of the customized product to the user, including a link to purchase the product from the predicted retailer. Then, in response to receiving a purchase request from the user, the processor completes a purchase of the customized product.

20 Claims, 6 Drawing Sheets

(56) References Cited

U.S. PATENT DOCUMENTS

| | | |
|---|---|---|
| 8,869,241 B2 | 10/2014 | Davis et al. |
| 8,880,100 B2 | 11/2014 | Dobyns |
| 8,909,771 B2 | 12/2014 | Heath |
| 8,972,275 B2 | 3/2015 | Park et al. |
| 9,015,247 B2 | 4/2015 | Whitney et al. |
| 9,047,631 B2 | 6/2015 | Sridharan et al. |
| 9,049,259 B2 | 6/2015 | Rathod |
| 9,262,781 B2 | 2/2016 | MacKinnon |
| 9,483,765 B2 | 11/2016 | Sahadevan et al. |
| 9,563,901 B2 | 2/2017 | Fleischman et al. |
| 9,595,059 B2 | 3/2017 | Knudson et al. |
| 9,595,068 B2 | 3/2017 | Tediamulia et al. |
| 9,710,821 B2 | 7/2017 | Heath |
| 9,773,285 B2 | 9/2017 | Calman et al. |
| 9,990,643 B2 | 6/2018 | Yoder et al. |
| 10,096,033 B2 | 10/2018 | Heath |
| 10,096,043 B2 | 10/2018 | Beck et al. |
| 10,102,546 B2 | 10/2018 | Heath |
| 10,102,591 B2 | 10/2018 | McLaughlin et al. |
| 10,120,877 B2 | 11/2018 | Heath |
| 10,127,563 B2 | 11/2018 | Heath |
| 10,127,564 B2 | 11/2018 | Heath |
| 10,129,211 B2 | 11/2018 | Heath |
| 10,140,620 B2 | 11/2018 | Heath |
| 10,142,687 B2 | 11/2018 | Gurha |
| 10,181,126 B2 | 1/2019 | Fischer et al. |
| 10,204,327 B2 | 2/2019 | Katzin et al. |
| 10,217,117 B2 | 2/2019 | Heath |
| 10,223,710 B2 | 3/2019 | Purves et al. |
| 10,269,081 B1 | 4/2019 | Byrne |
| 10,291,947 B2 | 5/2019 | Bhatia et al. |
| 10,318,941 B2 | 6/2019 | Chawla et al. |
| 10,373,236 B2 | 8/2019 | Erez et al. |
| 10,410,223 B2 | 9/2019 | Hillerbrand et al. |
| 11,169,669 B1 * | 11/2021 | Swett .................... G06F 3/0482 |
| 2014/0279039 A1 * | 9/2014 | Systrom ............. G06Q 30/0224 |
| | | 705/14.66 |
| 2018/0075483 A1 * | 3/2018 | Boyarshinov ...... G06Q 30/0631 |
| 2018/0158100 A1 * | 6/2018 | Barak .................... H04W 4/21 |
| 2019/0306137 A1 * | 10/2019 | Isaacson ............. G06Q 30/0635 |
| 2019/0318405 A1 * | 10/2019 | Hu .......................... G06F 16/55 |
| 2019/0325498 A1 * | 10/2019 | Clark .................... G06K 7/1417 |

OTHER PUBLICATIONS

U.S. Appl. No. 10/380,702, filed Aug. 13, 2019, McCoy et al.

\* cited by examiner

SYSTEMS AND METHODS FOR A SOCIAL MEDIA PURCHASING TOOL

TECHNICAL FIELD

This disclosure relates generally to data storage, management, and use and, more particularly, to leveraging big data to identify and offer for purchase items displayed in social media posts.

BACKGROUND

Recent technological breakthroughs have substantially reduced data storage costs and provided for increased computational power. Such breakthroughs have enabled organizations to capture and store vast quantities of information generated by individuals who are increasingly conducting large portions of their daily lives while connected to the Internet.

SUMMARY

Recent technological breakthroughs have substantially reduced data storage costs and provided for increased computational power. Such breakthroughs have enabled organizations to capture and store vast quantities of information generated by individuals who are increasingly conducting large portions of their daily lives while connected to the Internet. For example, individuals often purchase products online, navigate between locations with the aid of GPS-enabled and internet-connected mobile devices, use social media to connect with other individuals online, and employ various IoT (Internet of Things) devices for a multitude of different purposes.

Given the large amount of time that many individuals spend online, online product views are increasingly influencing purchasing decisions. For example, when an individual views a social media post featuring his/her favorite celebrity wearing a particular article of clothing, that individual may wish to purchase the same (or a similar) piece of clothing. This may lead to an increased use of network resources, as the individual searches various websites to try to identify the product. Even when a social media post identifies the product depicted by the post (for example, when a social media influencer advertises a product and provides a link to purchase the product), a large amount of network resources may nevertheless be consumed by individuals seeking to identify less expensive versions of the product, or versions of the product with somewhat different features from the product being advertised.

This disclosure contemplates a social media purchasing tool that addresses one or more of the above issues. The tool leverages data collected from various retailer websites to identify products depicted in social media posts. The tool then determines retailers offering the products for sale, along with available customizations for the products. Based on historical purchases made by the user, the tool predicts customizations of the products that the user prefers, along with retailers from whom the user would prefer to purchase the product. The tool additionally presents recommendations of the customized products to the user, receives purchase requests, and purchases the products on the user's behalf. In this manner, one or more embodiments of the tool helps to reduce the network resources which would other be expended by users searching online to identify and purchase products depicted in social media posts. Certain embodiments of the social media purchasing tool are described below.

According to one embodiment, a system includes a device, a database, and a hardware processor. The device includes a display. The device receives a social network feed and displays the social network feed on the display. The social network feed includes a post. The post includes text and an image. The image depicts a product. The product includes a customizable feature. The database stores a purchase history of a user of the device. The purchase history includes a first record of a first historical product purchased by the user and a second record of a second historical product purchased by the user. The first record includes a name of a first merchant and a description of the first historical product. The second record includes a name of a second merchant and a description of the second historical product. The hardware processor determines that the device displayed the post. In response to determining that the device displayed the post, the processor also determines, using a machine learning algorithm, based on the image and the text, that the image depicts the product. The machine learning algorithm is trained to identify the product. The processor additionally determines a set of retailers offering the product for sale. The processor further predicts, based in part on the description of the first historical product and the description of the second historical product, a customization for the customizable feature of the product that the user prefers. The processor also predicts, based in part on the name of the first merchant and the name of the second merchant, a retailer of the set of retailers offering the product with the predicted customization. In response to predicting the customization and the retailer, the processor sends a recommendation of the product with the customization to the user. The recommendation includes a link to purchase the product with the customization from the predicted retailer. In response to sending the recommendation, the processor receives a response from the user. The response includes a purchase request. In response to receiving the response, the processor completes a purchase of the product with the predicted customization.

According to another embodiment, a method includes determining that a device displayed a post from a social network feed. The post includes text and an image. The image depicts a product which includes a customizable feature. In response to determining that the device displayed the post, the method also includes determining, using a machine learning algorithm, based on the image and the text, that the image depicts the product. The machine learning algorithm is trained to identify the product. The method additionally includes determining a set of retailers offering the product for sale. The method further includes predicting, based in part on a purchase history of a user of the device, a customization for the customizable feature of the product that the user prefers. Here, the purchase history of the user includes a first record of a first historical product purchased by the user and a second record of a second historical product purchased by the user. The first record includes a description of the first historical product. The second record includes a description of the second historical product. The method also includes predicting, based in part on the purchase history of the user, a retailer of the set of retailers offering the product with the predicted customization. Here, the first record of the first historical product further includes a name of a first merchant and the second record of the second historical product further includes a name of a second merchant. In response to predicting the customization and the retailer, the method includes sending a recommendation of the product with the customization to the user. The recommendation includes a link to purchase the product with the customization from the predicted retailer. In response to sending the recommendation, the method includes receiving a response from the user. The response includes a purchase request. In response to receiving the response, the method includes completing a purchase of the product with the predicted customization.

According to a further embodiment, a system includes a device, a storage element, and a processing element. The device includes a display. The device is operable to receive a social network feed. The device is also operable to display the social network feed on the display. The social network feed includes a post. The post includes text and an image. The image depicts a product that includes a customizable feature. The storage element is operable to store a purchase history of a user of the device. The purchase history includes a first record of a first historical product purchased by the user and a second record of a second historical product purchased by the user. The first record includes a name of a first merchant and a description of the first historical product. The second record includes a name of a second merchant and a description of the second historical product. The processing element is operable to determine that the device displayed the post. In response to determining that the device displayed the post, the processing element is operable to determine, using a machine learning algorithm, based on the image and the text, that the image depicts the product. The machine learning algorithm is trained to identify the product. The processing element is also operable to determine a set of retailers offering the product for sale. The processing element is additionally operable to predict, based in part on the description of the first historical product and the description of the second historical product, a customization for the customizable feature of the product that the user prefers. The processing element is further operable to predict, based in part on the name of the first merchant and the name of the second merchant, a retailer of the set of retailers offering the product with the predicted customization. In response to predicting the customization and the retailer, the processing element is operable to send a recommendation of the product with the customization to the user. The recommendation includes a link to purchase the product with the customization from the predicted retailer. In response to sending the recommendation, the processing element is operable to receive a response from the user. The response includes a purchase request. In response to receiving the response, the processing element is operable to complete a purchase of the product with the predicted customization. Completing the purchase of the product includes providing the predicted retailer with payment information of the user and providing the predicted retailer with a location of the user. In response to receiving the payment information and the location, the predicted retailer ships the product to the location.

Certain embodiments provide one or more technical advantages. For example, an embodiment helps to reduce the network resources that may otherwise be expended by users searching online to identify products depicted in social media posts. As another example, an embodiment uses a user's past purchases to determine customizations of products that the user is most likely to purchase, saving bandwidth and processing resources that may otherwise be expended by a user searching for suitable product versions. As a further example, an embodiment may leverage demographic information to identify customizations of products that a user may wish to purchase, while nevertheless complying with data privacy regulations. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 6 of the drawings, like numerals being used for like and corresponding parts of the various drawings.

Figure 1:
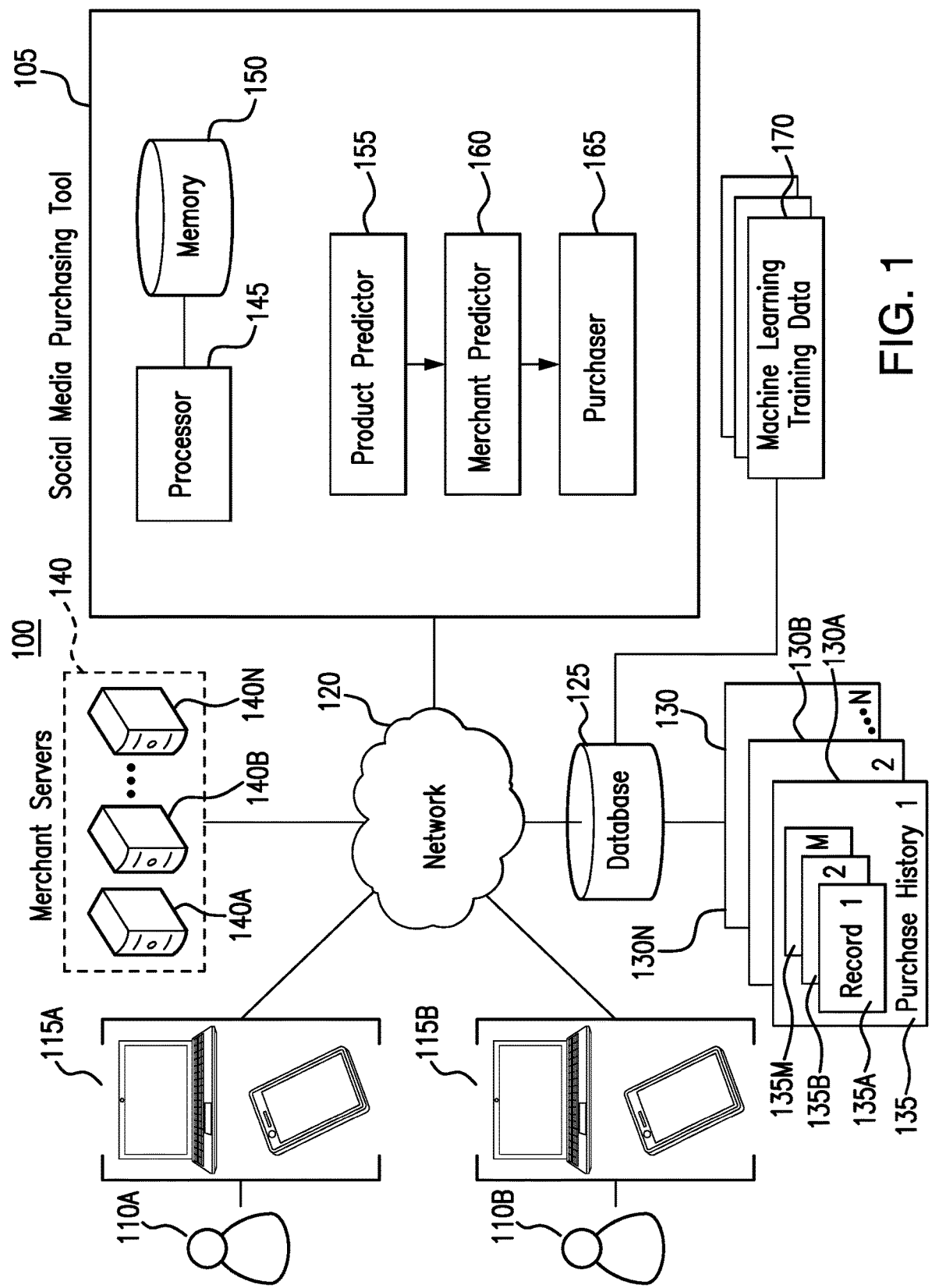
FIG. 1 illustrates an example system.

FIG. 1 illustrates an example system 100. As seen in FIG. 1, system 100 includes social media purchasing tool 105, one or more devices 115, network 120, database 125, and merchant servers 140. Generally, social media purchasing tool 105 (1) uses a machine learning algorithm to identify a product displayed in a social media post; (2) determines a set of retailers offering the product for sale; (3) identifies a set of customizations available for the product; (4) predicts, based on a purchase history of a user, a customization that the user prefers; (5) predicts a retailer of the set of retailers offering the product with the predicted customization, from whom the user would prefer to purchase the product; (6) sends a recommendation of the product to the user; and (7) completes a purchase of the product for the user in response to receiving a purchase request.

Devices 115 may be used by users 110A and 110B to receive social media feeds and to view social media posts. Devices 115 may also be used by users 110A and 110B to receive product recommendations from social media purchasing tool 105 and to send purchase requests to merchant servers 140 and/or social media purchasing tool 105, as described in further detail below, in the discussion of FIG. 5. In certain embodiments, devices 115 may communicate with social media purchasing tool 105 through network 120 via a web interface.

Devices 115 include any appropriate device for communicating with components of system 100 over network 120. For example, devices 115 may be a telephone, a mobile phone, a computer, a laptop, a tablet, a server and/or an automated assistant. This disclosure contemplates devices 115 being any appropriate device for sending and receiving communications over network 120 and for displaying posts from social media feeds. As an example, and not by way of limitation, device 115 may be a computer, a laptop, a wireless or cellular telephone, an electronic notebook, a personal digital assistant, a tablet, or any other device capable of receiving, processing, storing, and/or communicating information with other components of system 100. This disclosure contemplates device 115 containing a display or being coupled to a display such that device 115 may receive a social media feed and display posts from the social media feed on the display. Device 115 may also include a user interface, a microphone, keypad, or other appropriate terminal equipment usable by user 110. In some embodiments, an application executed by device 115 may perform the functions described herein.

Network 120 facilitates communication between and amongst the various components of system 100. This disclosure contemplates network 120 being any suitable network operable to facilitate communication between the components of system 100. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 125 may store a set of purchase histories 130. In certain embodiments, each of purchase histories 130A through 130N may be assigned to a user 110A or 110B, or any other individual for whom social media purchasing tool 105 may have access to purchasing information. In some embodiments, each of purchase histories 130A through 130N may be assigned to a given demographic. For example, purchase history 130A may be assigned to men between the ages of 18 and 25. This disclosure contemplates that purchase histories 130A through 130N may include records 135A through 135M of purchases made by users 110A and 110B, or any other individual for whom social media purchasing tool 105 may have access to purchasing information. In certain embodiments, records 135A through 135M may include lists of products purchased by users, along with descriptions of the products and the names of the merchants from whom the products were purchased. In some embodiments, the descriptions of the products may include customizations of the products that were chosen by the users. For example, the descriptions may include chosen colors, sizes, styles, or any other type of customizable feature.

This disclosure contemplates that purchase histories 130A through 130N may be obtained in any suitable manner. For example, in certain embodiments, users 110A and 110B may provide social media purchasing tool 105 with access to applications installed on devices 115A and 115B that are used by users 110A and 110B to purchase products and/or services. As another example, in certain embodiments, users 110A and 110B may provide social media purchasing tool 105 with access to their banking information. As a further example, in certain embodiments, users 110A and 110B may allow social media purchasing tool 105 to track their online activities. In some embodiments, social medial purchasing tool 105 may obtain purchase records 135A through 135M from retailers from whom individuals purchased products.

In certain embodiments, database 125 may also store machine learning training data 170. This disclosure contemplates that machine learning training data 170 may include any data that may be used to train a machine learning algorithm to identify products based on images of the products and text accompanying the images. For example, in certain embodiments, machine learning training data 170 may include images and text obtained from websites through conventional web scraping techniques. As another example, in certain embodiments, machine learning training data 170 may include images and text obtained from social media posts for which the products depicted in the social media posts are known.

Merchant servers 140 may be any components connected to social media purchasing tool 105 and/or devices 115 through network 120 that are capable of receiving purchase requests for products and processing these purchase requests, such that in response to receiving and processing a purchase request for a given product from a user 110A (or from social media purchasing tool 105 on behalf of user 110A), a merchant associated with a merchant server 140 may send the product to a location specified for user 110A. This disclosure contemplates that merchant servers 140 may additionally operate websites through which the merchants may offer their products for sale. Such websites may contain images and/or text associated with the products.

As seen in FIG. 1, social media purchasing tool 105 includes processor 145, memory 150, product predictor 155, merchant predictor 160, and purchaser 165. This disclosure contemplates processor 145 and memory 150 being configured to perform any of the functions of social media purchasing tool 105 described herein. Generally, social media purchasing tool 105 implements product predictor 155 to identify a product depicted in a social media post viewed by user 110A, identify one or more retailers offering the product (or similar products) for sale, identify customizations available for the product, and predict a customization of the product that user 110A prefers, as described in further detail below, in the discussion of FIG. 3. Social media purchasing tool 105 also implements merchant predictor to predict a merchant of the one or more merchants identified by product predictor 155 who is offering the product with the predicted customization and from whom user 110A would prefer to purchase the product, as described in further detail below, in the discussion of FIG. 4. Social media purchasing tool 105 further implements purchaser 165 to send a recommendation of the product with the predicted customization to user 110A, to receive a purchase request from user 110A, and to complete a purchase of the product for user 110A, as described in further detail below, in the discussion of FIG. 5. In this manner, certain embodiments of social media purchasing tool 105 may help to reduce the network and processing resources that may otherwise be used by a user 110A searching the internet to identify a product that he/she viewed on a social media post and would like to purchase.

Processor 145 is any electronic circuitry, including, but not limited to microprocessors, application specific integrated circuits (ASIC), application specific instruction set processor (ASIP), and/or state machines, that communicatively couples to memory 160 and controls the operation of social media purchasing tool 105. Processor 145 may be 8-bit, 16-bit, 32-bit, 64-bit or of any other suitable architecture. Processor 145 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 145 may include other hardware and software that operates to control and process information. Processor 145 executes software stored on memory to perform any of the functions described herein. Processor 145 controls the operation and administration of social media purchasing tool 105 by processing information received from network 120, devices 115, and memory 150. Processor 145 may be a programmable logic device, a microcontroller, a microprocessor, any suitable processing device, or any suitable combination of the preceding. Processor 145 is not limited to a single processing device and may encompass multiple processing devices.

Memory 150 may store, either permanently or temporarily, data, operational software, or other information for processor 145. Memory 150 may include any one or a combination of volatile or non-volatile local or remote devices suitable for storing information. For example, memory 150 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 160, a disk, a CD, or a flash drive. In particular embodiments, the software may include an application executable by processor 145 to perform one or more of the functions described herein.

In certain embodiments, social media purchasing tool 105 may leverage data stored in purchase histories 130 in order to help conserve network resources, by identifying products depicted in social media posts and offering recommendations of such products to a user, customized in a manner that the user will likely prefer. In this manner, social media purchasing tool 105 may help to reduce bandwidth, network traffic, database queries, and any other resource consuming process that may otherwise occur when the user searches the internet himself/herself to try to identify a product that he/she viewed in a social media post.

Modifications, additions, or omissions may be made to the systems described herein without departing from the scope of the invention. For example, system 100 may include any number of users 110, devices 115, networks 120, databases 125, and merchant servers 140. The components may be integrated or separated. Moreover, the operations may be performed by more, fewer, or other components. Additionally, the operations may be performed using any suitable logic comprising software, hardware, and/or other logic.

Figure 2:
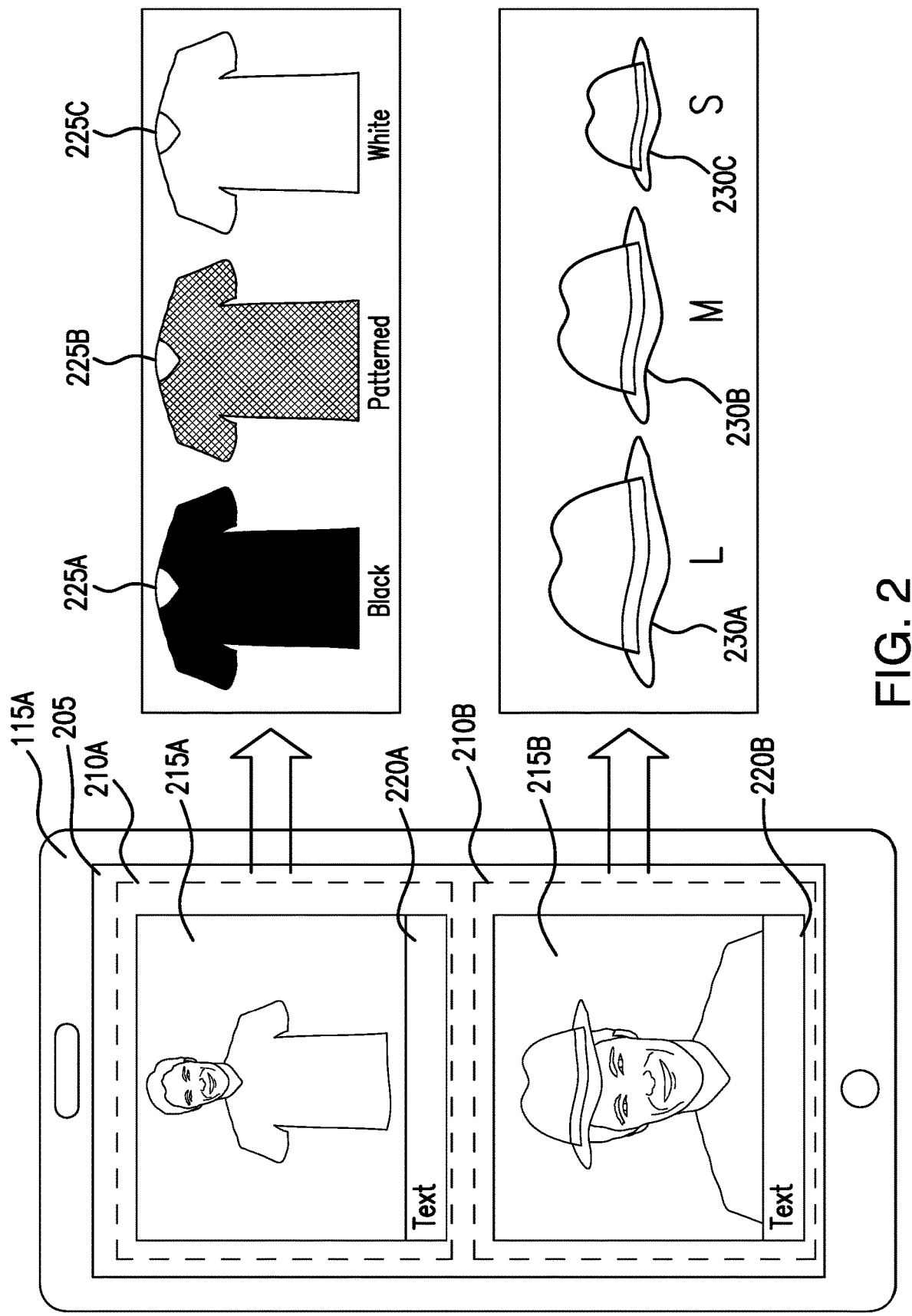
FIG. 2 presents examples illustrating different types of customizable products that may be identified from social media posts.

FIG. 2 presents examples illustrating different types of customizable products that social media purchasing tool 105 may identify from social media posts. FIG. 2 illustrates a social media feed displayed on display 205 of device 115A. The social media feed includes a first social media post 210A and a second social media post 210B. First social media post 210A includes an image 215A and text 220A. Similarly, second social media post 220A includes image 215B and text 220B. This disclosure contemplates that image 215A and 215B may depict one or more products. For example, as illustrated in FIG. 2, image 215A may depict a men's t-shirt and image 215B may depict a hat. This disclosure further contemplates that text 220A and text 220B may include one or more words or phrases that may help to identify the products depicted in images 215A and 215B. As an example, text 220A and/or 220B may include phrases describing the products depicted in images 215A and 215B. For example, text 220A may include the phrase "new t-shirt," and text 220B may include the phrase "favorite hat." As another example, text 220A and/or 220B may include one or more hashtags that may help to identify the products depicted in images 215A and 215B. For example, text 220A may include one or more hashtags such as "#newshirt," "#basictee," "#tshirtweather," or any other hashtag that may be used to determine that image 215A includes a t-shirt. Similarly, text 220B may include one or more hashtags such as "#newhat," "#favoritehat," "#signaturehat," or any other suitable hashtag that may be used to determine that image 215B includes a hat. As a further example, text 220A and/or 220B may include a link through which a user may purchase the product. For example, in certain embodiments, social media posts 210A and/or 210B may be generated by social media influencers, who are paid to advertise the products depicted in their posts. Accordingly, text 215A and/or text 215B may include phrases such as "you can purchase this product by following the link in my profile," followed by a link to the influencer's profile. Navigating through one or more such links may lead to a website from which a specific version of the product may be purchased.

As seen in FIG. 2, the products depicted in social media posts 210A and 210B may include one or more customizable features. As an example, the t-shirt illustrated in social media post 210A may be customizable in terms of color and/or material. For example, the t-shirt may be available as a black t-shirt 225A, a patterned t-shirt 225B, or a white t-shirt 225C. As another example, the hat illustrated in social media post 210B may be customizable in terms of size. For example, the hat may be available as a large hat 230A, a media hat 230B, or a small hat 230C. This disclosure contemplates that products depicted in social media posts 210 may be customizable in any suitable manner and that any given product may be customizable in multiple ways. Additionally, this disclosure contemplates that social media purchasing tool 105 may identify the available customizations in any suitable manner. For example, in certain embodiments, social media purchasing tool 105 may identify the available customizations for a given product by locating the product on one or more retailer websites, and determining, from the product options listed on the websites, the available customizations. This process is described in further detail below, in the discussion of FIG. 3.

Figure 3:
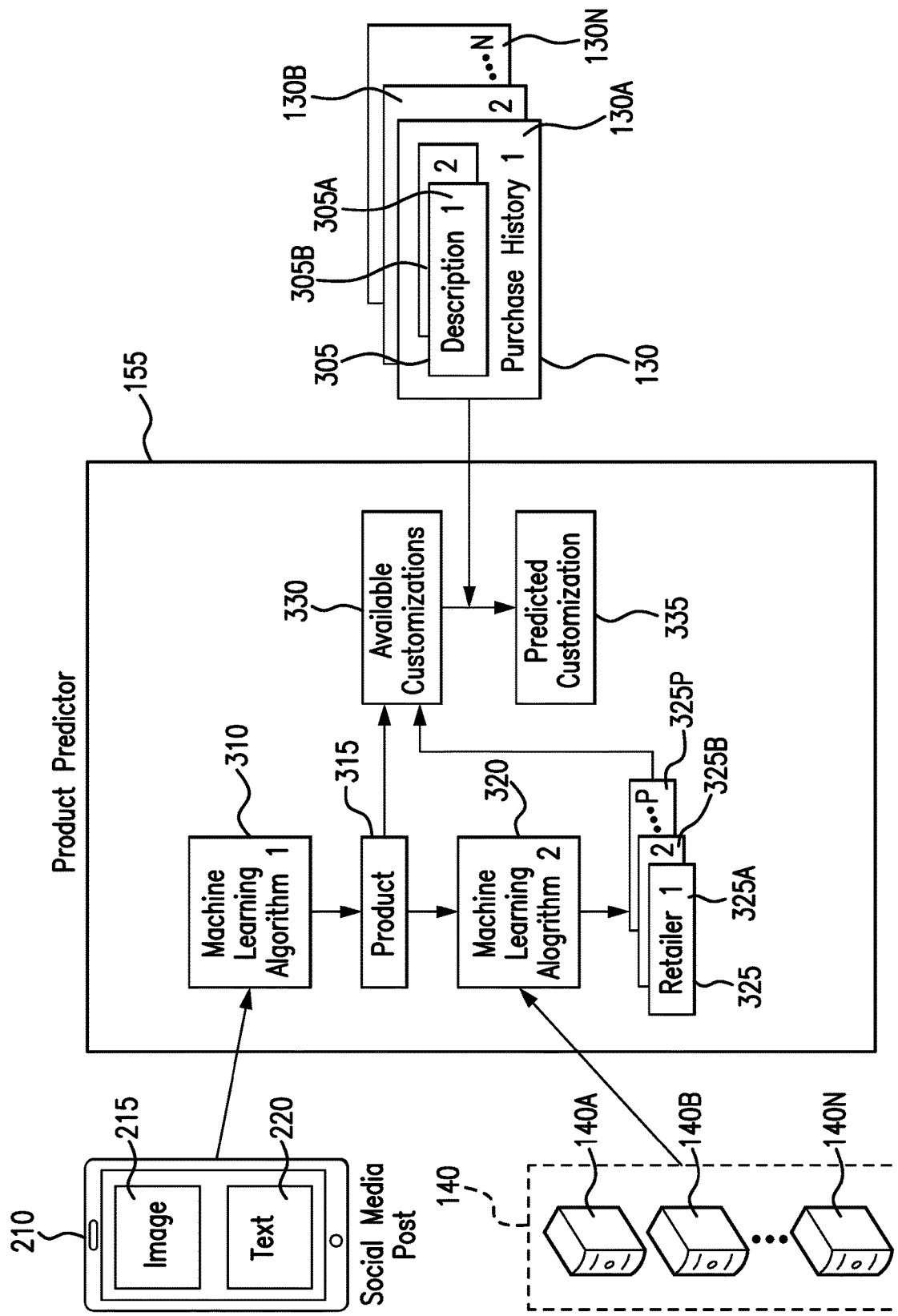
FIG. 3 illustrates the product predictor component of the social media purchasing tool of the system of FIG. 1.

FIG. 3 illustrates product predictor 155 of social media purchasing tool 105. This disclosure contemplates that product predictor 155 is configured to determine that a device 115 displayed a social media post 210 and to identify one or more products 315 depicted in social media post 210. In certain embodiments, product predictor 155 uses a machine learning algorithm 310 to identify product 315 in social media post 210. This disclosure contemplates that machine learning algorithm 310 may be any algorithm or combination of algorithms that is trained to identify products 315 from social media posts 210. For example, machine learning algorithm 310 may include neural network algorithms, deep learning techniques, classification models, and/or any other suitable machine learning techniques that may be used to develop a machine learning algorithm capable of identifying product 315 in social media post 210 based on an image 215 depicting the product and text 220 accompanying image 215.

This disclosure contemplates that machine learning algorithm 310 may be trained to identify products 315 using machine learning training data 170 stored in database 125. This disclosure contemplates that machine learning training data 170 may include any data that may be used to train machine learning algorithm 310 to identify products 315 based on images of the products and text accompanying the images. For example, in certain embodiments, machine learning training data 170 may include images and text obtained from websites through conventional web scraping techniques. As another example, in certain embodiments, machine learning training data 170 may include images and text obtained from social media posts for which the products depicted in the social media posts are known.

Once product predictor 155 has identified product 315 in social media post 210, product predictor 155 next determines a set of retailers 325 offering product 315 for sale. This disclosure contemplates that product predictor 155 may determine the set of retailers 325 offering product 315 for sale in any suitable manner. For example, in certain embodiments, product predictor 155 may use a machine learning algorithm 320 to determine retailers 325A through 325P offering product 315 for sale. Machine learning algorithm 320 may compare product 315 to images and text associated with products offered for sale on merchant websites to locate retailers 325A through 325P offering products with a given degree of similarity to product 315. This disclosure contemplates that the degree of similarity may be adjusted. As an example, certain embodiments may use a high degree of similarity in order to identify retailers 325A through 325P offering the exact product 315 depicted in social media post 210 for sale. As another example, some embodiments may use a lower degree of similarity in order to identify retailers 325A through 325P offering not only the exact product 315 depicted in social media post 210 for sale, but also similar products to product 315. This may be desirable, for example, to provide product recommendations to users who may not otherwise be willing to pay for the products depicted in certain social media posts. For example, if social media post 210 depicts a $500 designer t-shirt, providing user 110A with recommendations of similar, less expensive products may be desirable to reduce the computational resources that may otherwise be expended by user 110A searching the internet for a cheaper version of the t-shirt.

This disclosure contemplates that machine learning algorithm 320 may be trained to identify retailers 325A through 325P offering product 315 (and/or similar products) for sale using machine learning training data 170 stored in database 125. This disclosure contemplates that machine learning training data 170 may include any data that may be used to train machine learning algorithm 320 to identify retailers 325A through 325P offering product 315 (and/or similar products) for sale by comparing product 315 to images and/or text depicting/describing products offered for sale on websites operated by retailers 325A through 325P. For example, in certain embodiments, machine learning training data 170 may include images and text obtained from websites through conventional web scraping techniques.

This disclosure contemplates that in certain embodiments, machine learning algorithm 320 is distinct from machine learning algorithm 310, such that machine learning algorithm 310 first operates to identify product 315 and then once machine learning algorithm 310 has identified product 315, machine learning algorithm 320 operates to identify retailers 325A through 325P offering product 315 (and/or similar products) for sale. This disclosure also contemplates that in some embodiments, machine learning algorithm 320 is combined with machine learning algorithm 310, such that the combined machine learning algorithm both identifies product 315 and retailers 325A through 325P offering product 315 (and/or similar products) for sale.

Once product predictor 155 has determined the set of retailers 325 offering product 315 (and/or similar products) for sale, product predictor 155 next determines available customizations 330 for product 315. This disclosure contemplates that any number of customizations may be available for a given product 315. This disclosure also contemplates that product predictor 155 may determine available customizations 330 for product 315 in any suitable manner. As an example, in certain embodiments, product predictor 155 may determine available customizations 330 by determining the customizations offered by each of retailers 325A through 325P for product 315. For example, if product 315 is a t-shirt, product predictor 155 may determine that retailer 325A offers the t-shirt in either a black color or a white color, and in sizes small (S), medium (M), and large (L). Similarly, product predictor 155 may determine that retailer 325B offers the t-shirt in only black, but in sizes extra-small (XS), S, M, L, and extra-large (XL). Accordingly, assuming that retailer 325A and 325B are the only retailers determined by product predictor 155 to offer the t-shirt for sale, the available customizations 330 for the t-shirt are as follows: (black, XS), (black, S), (black, M), (black, L), (black, XL), (white, S), (white, M), and (white, L).

Once product predictor 155 has determine the available customizations 330 for product 315, product predictor 155 next predicts a customization 335 that user 110A will prefer. In certain embodiments, product predictor 155 predicts customization 335 that user 110A will prefer based on purchase history 130A of user 110A. For example, in certain embodiments, records 135 stored in purchase history 130A, assigned to user 110A, may include descriptions 305 of products previously purchased by user 110A. Descriptions 305 may include customizations previously chosen by user 110A for products previously purchased by user 110A. For example, description 305A may indicate that user 110A previously bought a black sweater in size small, and description 305B may indicate that user 110A previously bought a pair of black pants in size medium. Product predictor 155 may then predict, based on descriptions 305, a customization 335 of product 315 that user 110A prefers. As an example, product predictor 155 may determine, out of available customizations 330 offered for product 315, those customizations most frequently chosen by user 110A for other products purchased by user 110A. For example, product predictor 155 may determine, based on descriptions 305, that user 110A purchases more black products than white products, and typically purchases products for his/her upper body in size small. Accordingly, assuming available customizations 330 for the t-shirt in the example above of: (black, XS), (black, S), (black, M), (black, L), (black, XL), (white, S), (white, M), and (white, L), product predictor 155 may determine a predicted customization 335 of (black, S) for product 315.

In some embodiments, product predictor 155 may determine predicted customization 355 based on purchase histories 130 of multiple users 110 and/or other individuals for whom social media purchasing tool 105 has access to purchasing information. In such embodiments, social media purchasing tool 105 may store purchase histories 130 according to demographic information, rather than personal identification information. As an example, social media purchasing tool 105 may store purchase histories 130 according to age and gender. For example, first purchase history 130A may include records 135 of products purchased by men between the ages of 18 and 25, while second purchase history 130B may include records 135 of products purchased by women between the ages of 25 and 35. Product predictor 155 may then determine into which demographic group user 110A falls and use the purchase history 130 assigned to that demographic group in order to determine predicted customization 335. This disclosure contemplates that product predictor 155 may determine into which demographic group user 110A falls in any suitable manner. For example, in certain embodiments, product predictor 155 may determine the demographic group into which user 110A falls based on information included in user 110A's social media profile. As another example, in certain embodiments, social media purchasing tool 105 may explicitly request that user 110A supply the tool with his/her age and gender.

Once product predictor 155 has determined into which demographic group user 110A falls, product predictor 155 may use the purchase history 130 assigned to the given demographic group to determine predicted customization 335. For example, product predictor 155 may determine that user 110A is a 20-year-old man. Accordingly, product predictor 155 may use purchase history 130A, assigned to men between the ages of 18 and 25 to determine predicted customization 335. This disclosure contemplates that product predictor 155 may use purchase histories 130, assigned to particular demographic groups, to determine predicted customization 335 in any suitable manner. For example, in certain embodiments, records 135 stored in purchase history 130A, assigned to the demographic group to which user 110A belongs, may include descriptions 305 of products previously purchased by other individuals/users 110 in the demographic group. Descriptions 305 may include customizations previously chosen by other individuals/users 110 in the demographic group for products previously purchased by those individuals/users 110. Such descriptions 305 may indicate trends among the given demographic group. For example, descriptions 305 may indicate that black is the most popular color for clothing among men between the ages of 18 and 25. Accordingly, product predictor 155 may determine a predicted customization that includes a black color, when product 315 is a piece of clothing and user 110A falls into the demographic of men between the ages of 18 and 25.

Determining predicted customization 335 based on purchase histories 130 assigned to demographic groups rather than individual users may be desirable in jurisdictions with data privacy laws which prevent the storage of personal information (such as purchase histories assigned to individuals). This may also be desirable for those users 110 who are concerned about their data privacy.

Product predictor 155 may be a software module stored in memory 150 and executed by processor 145. An example algorithm for product predictor 155 is as follows: determine that user 110A viewed social media post 210 on device 115A; determine, using machine learning algorithm 310, based on image 215 and text 220, that social media post 210 depicts product 315; determine, using machine learning algorithm 320, that retailers 325A through 325P are offering product 315 (and/or similar products) for sale; identify, based on the customizations for product 315 offered by retailers 325A through 325P, available customizations 330 for product 315; predict, based on purchase history 130A, assigned to user 110A, predicted customization 335 that user 110A prefers.

Figure 4:
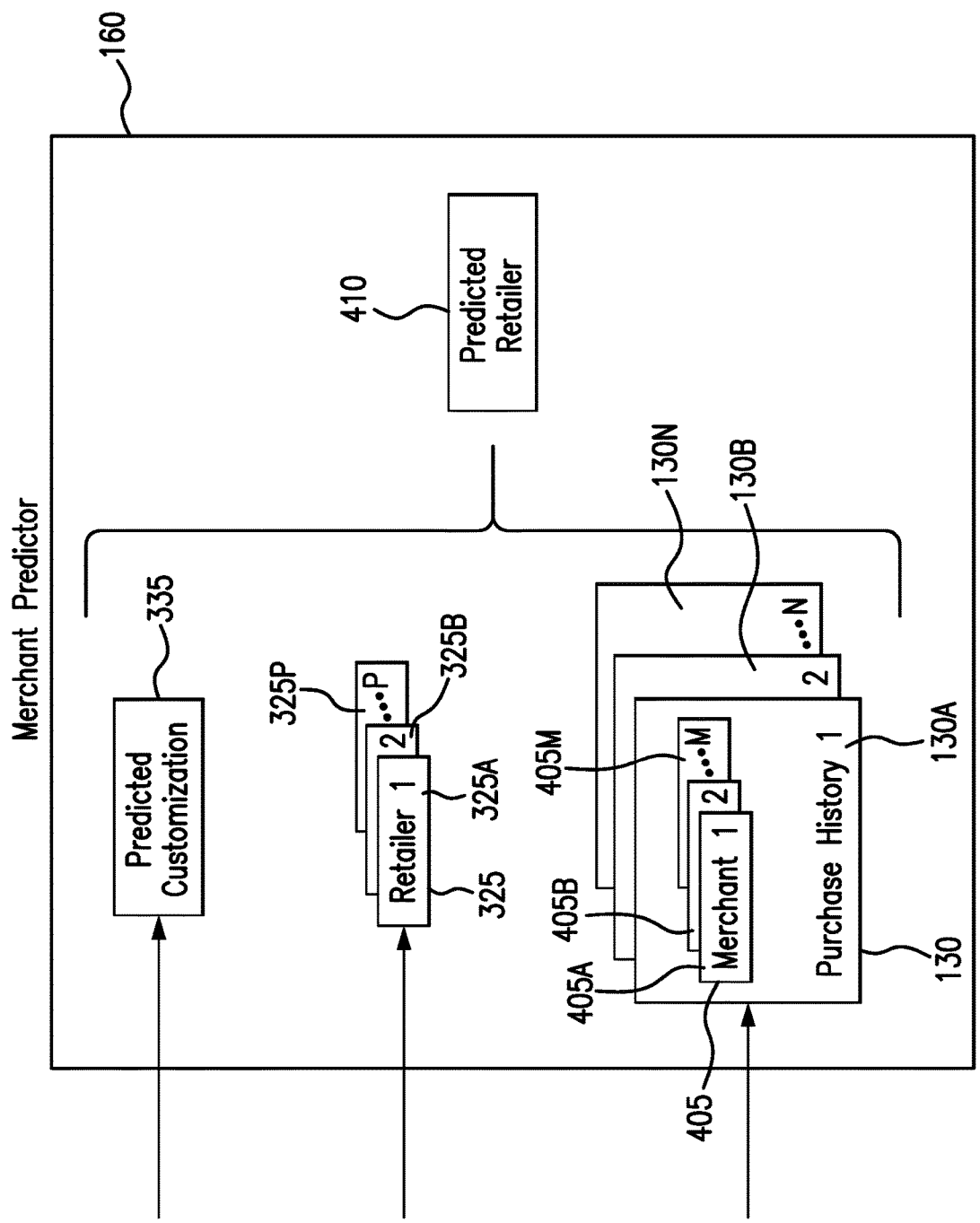
FIG. 4 illustrates the merchant predictor component of the social media purchasing tool of the system of FIG. 1.

FIG. 4 illustrates merchant predictor 160 of social media purchasing tool 105. This disclosure contemplates that merchant predictor 160 is configured to determine a retailer 410 of the set of retailers 325 offering for sale product 315 with predicted customization 335. In certain embodiments, merchant predictor 160 may determine retailer 410 based on set of retailers 325 and predicted customization 335. For example, in certain embodiments, merchant predictor 160 may determine that retailer 325A is the only retailer offering product 315 with predicted customization 335 for sale (i.e., the other retailers 325B through 325P, while offering product 315 for sale, do not offer product 315 with predicted customization 335). In such embodiments, merchant predictor 160 may select retailer 325A as predicted retailer 410.

In some embodiments, merchant predictor 160 may determine predicted retailer 410 based on set of retailers 325, predicted customization 335, and purchase history 130A of user 110A. For example, in certain embodiments, records 135 stored in purchase history 130A, assigned to user 110A, may include names of merchants 405 from whom user 110A previously purchased products. In such embodiments, merchant predictor 160 may determine predicted retailer 410 as the retailer of retailers 325A through 325P, offering product 315, from whom user 110A has most frequently purchased previous products.

In some embodiments, merchant predictor 160 may determine predicted retailer 410 based on purchase histories 130 of multiple users 110 and/or other individuals for whom social media purchasing tool 105 has access to purchasing information. In some such embodiments, social media purchasing tool 105 may store purchase histories 130 according to demographic information. As an example, social media purchasing tool 105 may store purchase histories 130 according to age and gender. For example, first purchase history 130A may include records 135 of products purchased by men between the ages of 18 and 25, while second purchase history 130B may include records 135 of products purchased by women between the ages of 25 and 35. Merchant predictor 160 may then determine into which demographic group user 110A falls and use the purchase history 130 assigned to that demographic group in order to determine predicted retailer 410. For example, merchant predictor 160 may determine that user 110A is a 20-year-old man. Accordingly, merchant predictor 160 may use purchase history 130A, assigned to men between the ages of 18 and 25 to determine predicted retailer 410. This disclosure contemplates that merchant predictor 160 may use purchase histories 130, assigned to particular demographic groups, to determine predicted retailer 410 in any suitable manner. For example, in certain embodiments, records 135 stored in purchase history 130A, assigned to the demographic group to which user 110A belongs, may include names 405 of retailers from whom individuals/users 110 in the demographic group previously purchased products. Merchant predictor 160 may then determine predicted retailer 410 as the most popular retailer from whom individuals in user 110A's demographic group previously purchased products.

In other such embodiments, merchant predictor 160 may determine that other individuals/users 110 have previously purchased product 315, based on the presence of product 315 in purchase histories 130. Merchant predictor 160 may then determine the most popular retailer offering product 315 with predicted customization 335, from whom those other individuals/users 110 previously purchased product 315, and select this retailer as predicted retailer 410.

Merchant predictor 160 may be a software module stored in memory 150 and executed by processor 145. An example algorithm for merchant predictor 160 is as follows: set a loop variable equal to 1; determine, based on purchase history 130A, assigned to user 110A, the retailer of the set of retailers 325A through 325P from whom user 110A has purchased the most products; while the loop variable is equal to 1: {determine whether the determined retailer is offering product 315 with predicted customization 335; if the determined retailer is offering product 315 with predicted customization 335: {assign the determined retailer to predicted retailer 410; set the loop variable equal to 0}; if the determined retailer is not offering product 315 with predicted customization 335, determine the retailer of the set of retailers 325A through 325P from whom user 110A purchased the next-most products}.

Figure 5:
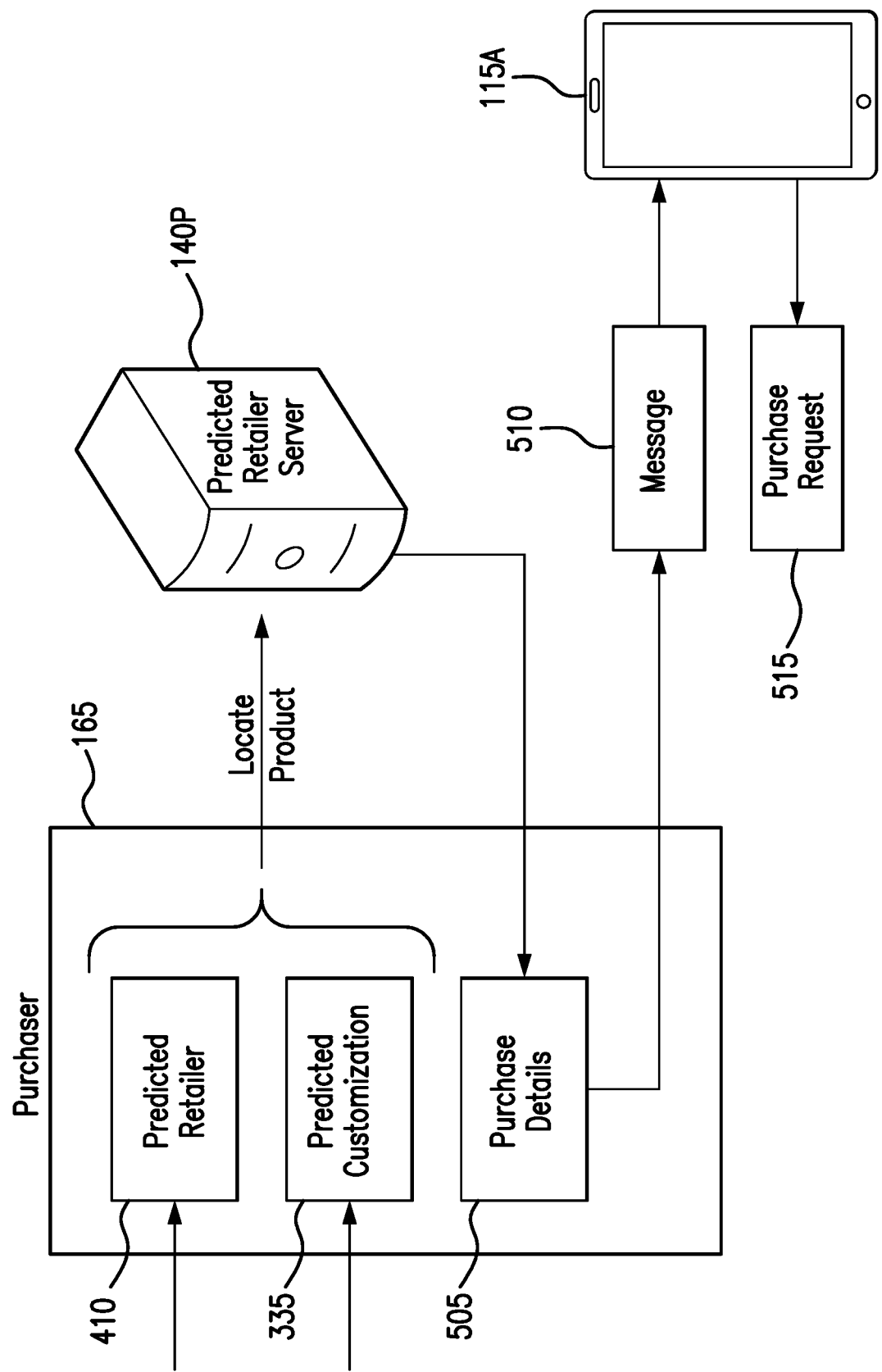
FIG. 5 illustrates the purchaser component of the social media purchasing tool of the system of FIG. 1.

FIG. 5 illustrates purchaser 165 of social media purchasing tool 105. Once product predictor 155 has determined predicted customization 335 for product 315, and merchant predictor 160 has determine predicted retailer 410 offering product 315 with predicted customization 335 for sale, purchaser 165 may next send a recommendation 510 of product 315 with predicted customization 335 to user 110A. This disclosure contemplates that recommendation 510 may include purchase details 505 for product 315 obtained from retailer server 140P of predicted retailer 410.

In certain embodiments, recommendation 510 may include a link through which user 110A may purchase product 315. For example, in certain embodiments, recommendation 510 may contain a link through which user 110A may purchase product 315 directly from predicted retailer server 140P. In such embodiments, user 110A may send a purchase request 515 directly to predicted retailer server 140P. In other embodiments, recommendation 510 may contain a link through which user 110A may instruct social media purchasing tool 105 to purchase product 315 from predicted retailer server 140P on the user's behalf. In such embodiments, user 110A may send a purchase request 515 to social media purchasing tool 105 that includes the user's banking information and/or permission for social media purchasing tool 105 to access the user's banking information. Social media purchasing tool 105 may then purchase product 315 from predicted retailer server 140P by supplying predicted retailer server 140P with the user's purchase information and instructing predicted retailer 410 to send product 315 to the user's location. This disclosure contemplates that in certain embodiments, social media purchasing tool 105 may determine the user's location based on the user's purchase history 130A. In other embodiments, social media purchasing tool 105 may determine the user's location from purchase request 515.

Purchaser 165 may be a software module stored in memory 150 and executed by processor 145. An example algorithm for purchaser 165 is as follows: retrieve purchase details 505 for product 315 with predicted customization 410 from predicted retailer server 140P belonging to predicted retailer 410; form recommendation 510 of product 315, based on purchase details 505; send recommendation 510 to user 110A; receive purchase request 515 from user 110A; purchase product 315 from predicted retailer server 140P by supplying predicted retailer server 140P with user 110A's purchase information.

Figure 6:
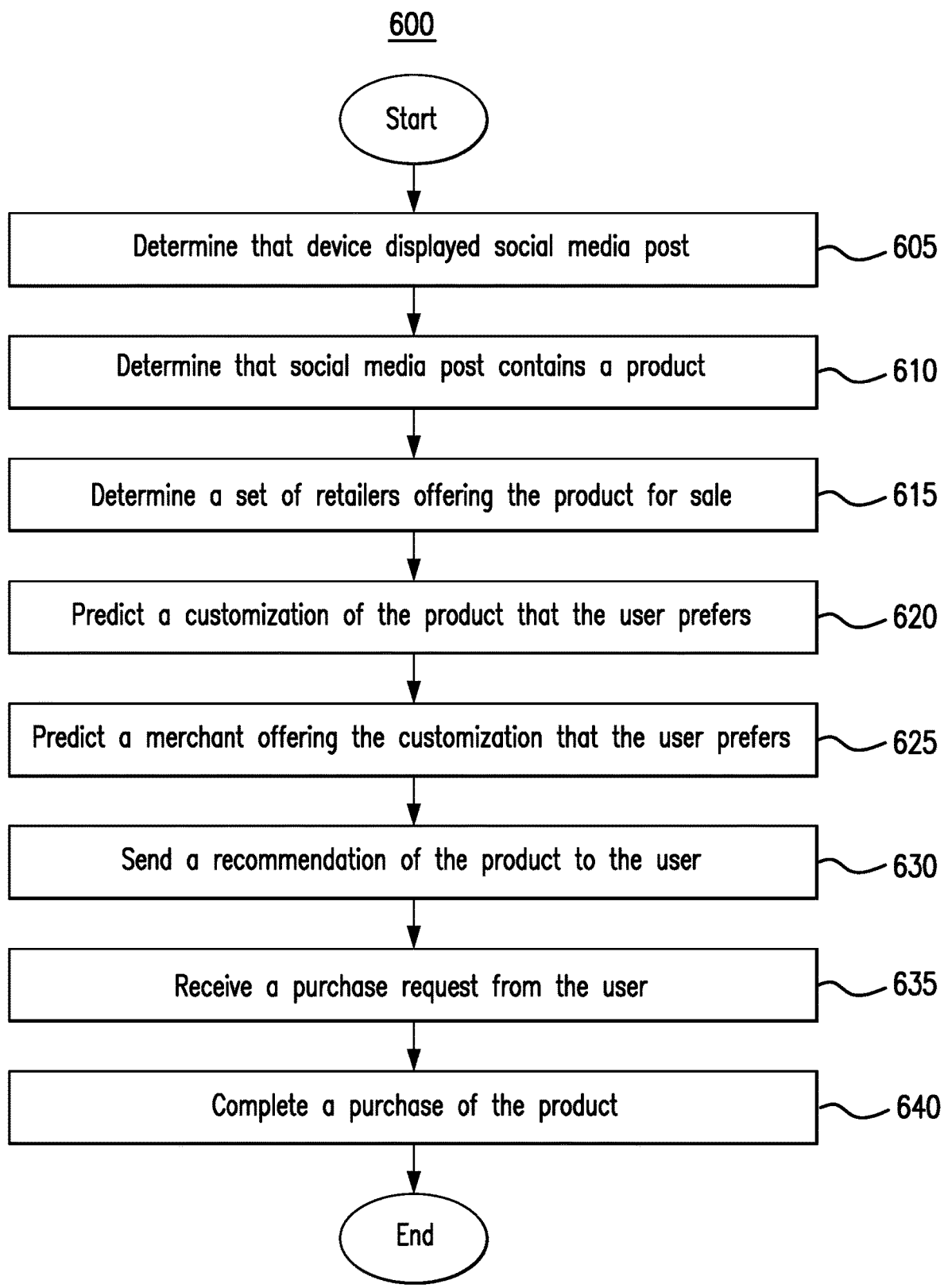
FIG. 6 presents a flowchart illustrating the process by which the social media purchasing tool of the system of FIG. 1 determines that a social media post depicts a customizable product and presents the product to a user for purchase, with a customization that the user prefers.

FIG. 6 presents a flowchart illustrating the process by which social media purchasing tool 105 determines that social media post 210 depicts a customizable product and presents the product to a user for purchase, with a customization that the user prefers.

In step 605, social media purchasing tool 105 determines that device 115 displayed social media post 210. This disclosure contemplates that social media post 210 includes both an image 215 and text 220. In step 610, social media purchasing tool 105 determines that social media post 210 depicts a product 315. In certain embodiments, social media purchasing tool 105 uses machine learning algorithm 310 to determine that social media post 210 depicts product 315. This disclosure contemplates that machine learning algorithm 310 may be any algorithm or combination of algorithms that is trained to identify products 315 from social media posts 210. For example, machine learning algorithm 310 may include neural network algorithms, deep learning techniques, classification models, and/or any other suitable machine learning techniques that may be used to develop a machine learning algorithm capable of identifying product 315 in social media post 210 based on an image 215 depicting the product and text 220 accompanying image 215.

In step 615, social media purchasing tool 105 determines a set of retailers 325 offering product 315 for sale. This disclosure contemplates that social media purchasing tool 105 may determine the set of retailers 325 offering product 315 for sale in any suitable manner. For example, in certain embodiments, social media purchasing tool 105 may use a machine learning algorithm 320 to determine retailers 325A through 325P offering product 315 for sale. Machine learning algorithm 320 may compare product 315 to images and text associated with products offered for sale on merchant websites to locate retailers 325A through 325P offering products with a given degree of similarity to product 315. This disclosure contemplates that the degree of similarity may be adjusted. As an example, certain embodiments may use a high degree of similarity in order to identify retailers 325A through 325P offering the exact product 315 depicted in social media post 210 for sale. As another example, some embodiments may use a lower degree of similarity in order to identify retailers 325A through 325P offering not only the exact product 315 depicted in social media post 210 for sale, but also similar products to product 315. This may be desirable, for example, to provide product recommendations to users who may not otherwise be willing to pay for the products depicted in certain social media posts. For example, if social media post 210 depicts a $500 designer t-shirt, providing user 110A with recommendations of similar, less expensive products may be desirable to reduce the computational resources that may otherwise be expended by user 110A searching the internet for a cheaper version of the t-shirt.

This disclosure contemplates that in certain embodiments, machine learning algorithm 320 is distinct from machine learning algorithm 310, such that machine learning algorithm 310 first operates to identify product 315 and then once machine learning algorithm 310 has identified product 315, machine learning algorithm 320 operates to identify retailers 325A through 325P offering product 315 (and/or similar products) for sale. This disclosure also contemplates that in some embodiments, machine learning algorithm 320 is combined with machine learning algorithm 310, such that the combined machine learning algorithm both identifies product 315 and retailers 325A through 325P offering product 315 (and/or similar products) for sale.

In step 620, social media purchasing tool 105 predicts a customization 335 of the set of available customizations 330 that user 110A prefers. To predict customization 335, social media purchasing tool 105 first determines available customizations 330 for product 315. This disclosure contemplates that any number of customizations may be available for a given product 315. This disclosure also contemplates that social media purchasing tool 105 may determine available customizations 330 for product 315 in any suitable manner. As an example, in certain embodiments, social media purchasing tool 105 may determine available customizations 330 by determining the customizations offered by each of retailers 325A through 325P for product 315. For example, if product 315 is a t-shirt, social media purchasing tool 105 may determine that retailer 325A offers the t-shirt in either a black color or a white color, and in sizes small (S), medium (M), and large (L). Similarly, social media purchasing tool 105 may determine that retailer 325B offers the t-shirt in only black, but in sizes extra-small (XS), S, M, L, and extra-large (XL). Accordingly, assuming that retailer 325A and 325B are the only retailers determined by social media purchasing tool 105 to offer the t-shirt for sale, the available customizations 330 for the t-shirt are as follows: (black, XS), (black, S), (black, M), (black, L), (black, XL), (white, S), (white, M), and (white, L).

Once social media purchasing tool 105 has determine the available customizations 330 for product 315, social media purchasing tool 105 next predicts a customization 335 that user 110A will prefer. In certain embodiments, social media purchasing tool 105 predicts customization 335 that user 110A will prefer based on purchase history 130A of user 110A. For example, in certain embodiments, records 135 stored in purchase history 130A, assigned to user 110A, may include descriptions 305 of products previously purchased by user 110A. Descriptions 305 may include customizations previously chosen by user 110A for products previously purchased by user 110A. For example, description 305A may indicate that user 110A previously bought a black sweater in size small, and description 305B may indicate that user 110A previously bought a pair of black pants in size medium. Social media purchasing tool 105 may then predict, based on descriptions 305, a customization 335 of product 315 that user 110A prefers. As an example, social media purchasing tool 105 may determine, out of available customizations 330 offered for product 315, those customizations most frequently chosen by user 110A for other products purchased by user 110A. For example, social media purchasing tool 105 may determine, based on descriptions 305, that user 110A purchases more black products than white products, and typically purchases products for his/her upper body in size small. Accordingly, assuming available customizations 330 for the t-shirt in the example above of: (black, XS), (black, S), (black, M), (black, L), (black, XL), (white, S), (white, M), and (white, L), product predictor 155 may determine a predicted customization 335 of (black, S) for product 315.

In some embodiments, social media purchasing tool 105 may determine predicted customization 355 based on purchase histories 130 of multiple users 110 and/or other individuals for whom social media purchasing tool 105 has access to purchasing information. In such embodiments, social media purchasing tool 105 may store purchase histories 130 according to demographic information. As an example, social media purchasing tool 105 may store purchase histories 130 according to age and gender. For example, first purchase history 130A may include records 135 of products purchased by men between the ages of 18 and 25, while second purchase history 130B may include records 135 of products purchased by women between the ages of 25 and 35. Social media purchasing tool 105 may then determine into which demographic group user 110A falls and use the purchase history 130 assigned to that demographic group in order to determine predicted customization 335. This disclosure contemplates that social media purchasing tool 105 may determine into which demographic group user 110A falls in any suitable manner. For example, in certain embodiments, social media purchasing tool 105 may determine the demographic group into which user 110A falls based on information included in user 110A's social media profile. As another example, in certain embodiments, social media purchasing tool 105 may explicitly request that user 110A supply the tool with his/her age and gender.

Once social media purchasing tool 105 has determined into which demographic group user 110A falls, social media purchasing tool 105 may use the purchase history 130 assigned to the given demographic group to determine predicted customization 335. For example, social media purchasing tool 105 may determine that user 110A is a 20-year-old man. Accordingly, social media purchasing tool 105 may use purchase history 130A, assigned to men between the ages of 18 and 25 to determine predicted customization 335. This disclosure contemplates that social media purchasing tool 105 may use purchase histories 130, assigned to particular demographic groups, to determine predicted customization 335 in any suitable manner. For example, in certain embodiments, records 135 stored in purchase history 130A, assigned to the demographic group to which user 110A belongs, may include descriptions 305 of products previously purchased by other individuals/users 110 in the demographic group. Descriptions 305 may include customizations previously chosen by other individuals/users 110 in the demographic group for products previously purchased by those individuals/users 110. Such descriptions 305 may indicate trends among the given demographic group. For example, descriptions 305 may indicate that black is the most popular color for clothing among men between the ages of 18 and 25. Accordingly, social media purchasing tool 105 may determine a predicted customization that includes a black color, when product 315 is a piece of clothing and user 110A falls into the demographic of men between the ages of 18 and 25.

Determining predicted customization 335 based on purchase histories 130 assigned to demographic groups rather than individual users may be desirable in jurisdictions with data privacy laws which prevent the storage of personal information (such as purchase histories assigned to individuals). This may also be desirable for those users 110 who are concerned about their data privacy.

In step 625, social media purchasing tool 105 predicts a merchant 410 offering product 315 with customization 335 that user 110A prefers. In certain embodiments, social media purchasing tool 105 may determine retailer 410 based on set of retailers 325 and predicted customization 335. For example, in certain embodiments, social media purchasing tool 105 may determine that retailer 325A is the only retailer offering product 315 with predicted customization 335 for sale (i.e., the other retailers 325B through 325P, while offering product 315 for sale, do not offer product 315 with predicted customization 335). In such embodiments, social media purchasing tool 105 may select retailer 325A as predicted retailer 410.

In some embodiments, social media purchasing tool 105 may determine predicted retailer 410 based on set of retailers 325, predicted customization 335, and purchase history 130A of user 110A. For example, in certain embodiments, records 135 stored in purchase history 130A, assigned to user 110A, may include names of merchants 405 from whom user 110A previously purchased products. In such embodiments, social media purchasing tool 105 may determine predicted retailer 410 as the retailer of retailers 325A through 325P, offering product 315, from whom user 110A has most frequently purchased previous products.

In some embodiments, social media purchasing tool 105 may determine predicted retailer 410 based on purchase histories 130 of multiple users 110 and/or other individuals for whom social media purchasing tool 105 has access to purchasing information. In some such embodiments, social media purchasing tool 105 may store purchase histories 130 according to demographic information. As an example, social media purchasing tool 105 may store purchase histories 130 according to age and gender. For example, first purchase history 130A may include records 135 of products purchased by men between the ages of 18 and 25, while second purchase history 130B may include records 135 of products purchased by women between the ages of 25 and 35. Social media purchasing tool 105 may then determine into which demographic group user 110A falls and use the purchase history 130 assigned to that demographic group in order to determine predicted retailer 410. For example, social media purchasing tool 105 may determine that user 110A is a 20-year-old man. Accordingly, social media purchasing tool 105 may use purchase history 130A, assigned to men between the ages of 18 and 25 to determine predicted retailer 410. This disclosure contemplates that social media purchasing tool 105 may use purchase histories 130, assigned to particular demographic groups, to determine predicted retailer 410 in any suitable manner. For example, in certain embodiments, records 135 stored in purchase history 130A, assigned to the demographic group to which user 110A belongs, may include names 405 of retailers from whom individuals/users 110 in the demographic group previously purchased products. Social media purchasing tool 105 may then determine predicted retailer 410 as the most popular retailer from whom individuals in user 110A's demographic group previously purchased products.

In other such embodiments, social media purchasing tool 105 may determine that other individuals/users 110 have previously purchased product 315, based on the presence of product 315 in purchase histories 130. Social media purchasing tool 105 may then determine the most popular retailer offering product 315 with predicted customization 335, from whom those other individuals/users 110 previously purchased product 315, and select this retailer as predicted retailer 410.

In step 630, social media purchasing tool 105 sends a recommendation of product 315 with predicted customization 335 to user 110A. This disclosure contemplates that recommendation 510 may include purchase details 505 for product 315 obtained from retailer server 140P of predicted retailer 410. In certain embodiments, recommendation 510 may include a link through which user 110A may purchase product 315. For example, in certain embodiments, recommendation 510 may contain a link through which user 110A may purchase product 315 directly from predicted retailer server 140P. In such embodiments, user 110A may send a purchase request 515 directly to predicted retailer server 140P. In other embodiments, recommendation 510 may contain a link through which user 110A may instruct social media purchasing tool 105 to purchase product 315 from predicted retailer server 140P on the user's behalf.

In step 635, social media purchasing tool 105 receives purchase request 515 from user 110A. In certain embodiments, purchase request 515 may include the user's banking information and/or permission for social media purchasing tool 105 to access the user's banking information. In step 640, social media purchasing tool 105 may then complete a purchase of product 315 from predicted retailer server 140P by supplying predicted retailer server 140P with the user's purchase information and instructing predicted retailer 410 to send product 315 to the user's location. This disclosure contemplates that in certain embodiments, social media purchasing tool 105 may determine the user's location based on the user's purchase history 130A. In other embodiments, social media purchasing tool 105 may determine the user's location from purchase request 515.

Modifications, additions, or omissions may be made to method 600 depicted in FIG. 6. Method 600 may include more, fewer, or other steps. For example, steps may be performed in parallel or in any suitable order. While discussed as social media purchasing tool 105 (or components thereof) performing the steps, any suitable component of system 100, such as device(s) 115 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A system comprising:
   a device comprising a display, the device configured to:
      receive a social network feed; and
      display the social network feed on the display, the social network feed comprising a post, the post comprising text and an image, the image depicting a product, wherein the product comprises a customizable feature;
   a database configured to store:
      a purchase history of a user of the device, the purchase history comprising:
         a first record of a first historical product purchased by the user, the first record comprising a name of a first merchant and a description of the first historical product; and
         a second record of a second historical product purchased by the user, the second record comprising a name of a second merchant and a description of the second historical product; and
      training data comprising:
         a plurality of images; and
         a plurality of sets of text, each set of text associated with an image of the plurality of images, wherein each image of the plurality of images and the associated set of text of the plurality of sets of text were obtained from a website;
   a memory configured to store a machine learning algorithm comprising a neural network; and
   a hardware processor configured to:
      train the machine learning algorithm, based on the training data, to identify products depicted in social network posts and retailers offering the identified products for sale;
      determine that the device displayed the post; and
      in response to determining that the device displayed the post:
         determine, using the machine learning algorithm, based on the image and the text, that the image depicts the product and that a set of retailers are offering the product for sale;
         predict, based in part on the description of the first historical product and the description of the second historical product, a customization for the customizable feature of the product that the user prefers;
         predict, based in part on the name of the first merchant and the name of the second merchant, a retailer of the set of retailers offering the product with the predicted customization;
         in response to predicting the customization and the retailer, send a recommendation of the product with the customization to the user, the recommendation comprising a link to purchase the product with the customization from the predicted retailer;

in response to sending the recommendation, receive a response from the user, the response comprising a purchase request; and in response to receiving the response, complete a purchase of the product with the predicted customization.

2. The system of claim 1, wherein completing the purchase of the product comprises providing the predicted retailer with payment information of the user and providing the predicted retailer with a location of the user, wherein in response to receiving the payment information and the location, the predicted retailer ships the product to the location.

3. The system of claim 2, wherein the location of the user is determined from the purchase history.

4. The system of claim 1, wherein predicting the customization comprises determining that at least one of the first historical product and the second historical product comprises the customization.

5. The system of claim 1, wherein:
the database is further configured to store a second purchase history of a second user, the second purchase history comprising:
  a third record of a third historical product purchased by the second user, the third record comprising a name of a third merchant and a description of the third historical product; and
  a fourth record of a fourth historical product purchased by the second user, the fourth record comprising a name of a fourth merchant and a description of the fourth historical product; and
predicting the customization is further based on the description of the third historical product and the description of the fourth historical product.

6. The system of claim 1, wherein predicting the retailer of the set of retailers comprises determining a ranked list of retailers from whom the user most frequently purchases products.

7. The system of claim 1, wherein the feature is at least one of a size and a color.

8. A method comprising:
training a machine learning algorithm, based on training data, to identify products depicted in social network posts and retailers offering the identified products for sale, wherein:
  the training data comprises:
    a plurality of images; and
    a plurality of sets of text, each set of text associated with an image of the plurality of images, wherein each image of the plurality of images and the associated set of text of the plurality of sets of text were obtained from a website; and
  the machine learning algorithm comprises a neural network;
determining that a device displayed a post from a social network feed, the post comprising text and an image, the image depicting a product, wherein the product comprises a customizable feature;
in response to determining that the device displayed the post:
  determining, using the machine learning algorithm, based on the image and the text, that the image depicts the product and that a set of retailers are offering the product for sale;
  predicting, based in part on a purchase history of a user of the device, a customization for the customizable feature of the product that the user prefers, wherein the purchase history of the user comprises a first record of a first historical product purchased by the user and a second record of a second historical product purchased by the user, the first record comprising a description of the first historical product, the second record comprising a description of the second historical product;
  predicting, based in part on the purchase history of the user, a retailer of the set of retailers offering the product with the predicted customization, wherein the first record of the first historical product further comprises a name of a first merchant and the second record of the second historical product further comprises a name of a second merchant;
  in response to predicting the customization and the retailer, sending a recommendation of the product with the customization to the user, the recommendation comprising a link to purchase the product with the customization from the predicted retailer;
  in response to sending the recommendation, receiving a response from the user, the response comprising a purchase request; and
  in response to receiving the response, completing a purchase of the product with the predicted customization.

9. The method of claim 8, wherein completing the purchase of the product comprises providing the predicted retailer with payment information of the user and providing the predicted retailer with a location of the user, wherein in response to receiving the payment information and the location, the predicted retailer ships the product to the location.

10. The method of claim 9, wherein the location of the user is determined from the purchase history.

11. The method of claim 8, wherein predicting the customization comprises determining that at least one of the first historical product and the second historical product comprises the customization.

12. The method of claim 8, wherein predicting the customization is further based on a description of a third historical product purchased by a second user and a description of a fourth historical product purchased by the second user.

13. The method of claim 8, wherein predicting the retailer of the set of retailers comprises determining a ranked list of retailers from whom the user most frequently purchases products.

14. The method of claim 8, wherein the feature is at least one of a size and a color.

15. A system comprising:
a device comprising a display, the device operable to:
  receive a social network feed; and
  display the social network feed on the display, the social network feed comprising a post, the post comprising text and an image, the image depicting a product, wherein the product comprises a customizable feature;
a storage element operable to store:
  a purchase history of a user of the device, the purchase history comprising:
    a first record of a first historical product purchased by the user, the first record comprising a name of a first merchant and a description of the first historical product; and a second record of a second historical product purchased by the user, the second record comprising a name of a second merchant and a description of the second historical product; and training data comprising:
  a plurality of images; and
  a plurality of sets of text, each set of text associated with an image of the plurality of images, wherein each image of the plurality of images and the associated set of text of the plurality of sets of text were obtained from a website;

a memory configured to store a machine learning algorithm comprising a neural network; and a processing element operable to:
  train the machine learning algorithm, based on the training data, to identify products depicted in social network posts and retailers offering the identified products for sale;
  determine that the device displayed the post; and
  in response to determining that the device displayed the post;
    determine, using the machine learning algorithm, based on the image and the text, that the image depicts the product and that a set of retailers are offering the product for sale;
    predict, based in part on the description of the first historical product and the description of the second historical product, a customization for the customizable feature of the product that the user prefers;
    predict, based in part on the name of the first merchant and the name of the second merchant, a retailer of the set of retailers offering the product with the predicted customization;
    in response to predicting the customization and the retailer, send a recommendation of the product with the customization to the user, the recommendation comprising a link to purchase the product with the customization from the predicted retailer;
    in response to sending the recommendation, receive a response from the user, the response comprising a purchase request; and
    in response to receiving the response, complete a purchase of the product with the predicted customization, wherein completing the purchase of the product comprises providing the predicted retailer with payment information of the user and providing the predicted retailer with a location of the user, wherein in response to receiving the payment information and the location, the predicted retailer ships the product to the location.

16. The system of claim 15, wherein the location of the user is determined from the purchase history.

17. The system of claim 15, wherein predicting the customization comprises determining that at least one of the first historical product and the second historical product comprises the customization.

18. The system of claim 15, wherein:
  the storage element is further operable to store a second purchase history of a second user, the second purchase history comprising:
    a third record of a third historical product purchased by the second user, the third record comprising a name of a third merchant and a description of the third historical product; and
    a fourth record of a fourth historical product purchased by the second user, the fourth record comprising a name of a fourth merchant and a description of the fourth historical product; and
  predicting the customization is further based on the description of the third historical product and the description of the fourth historical product.

19. The system of claim 15, wherein predicting the retailer of the set of retailers comprises determining a ranked list of retailers from whom the user most frequently purchases products.

20. The system of claim 15, wherein the feature is at least one of a size and a color.

\* \* \* \* \*